Dec. 22, 1970    M. J. RUDD    3,548,655
MEASUREMENT OF FLUID OR SURFACE VELOCITIES
Filed Oct. 2, 1968    2 Sheets-Sheet 1
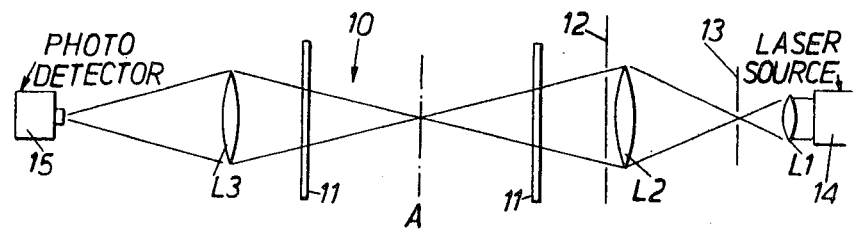
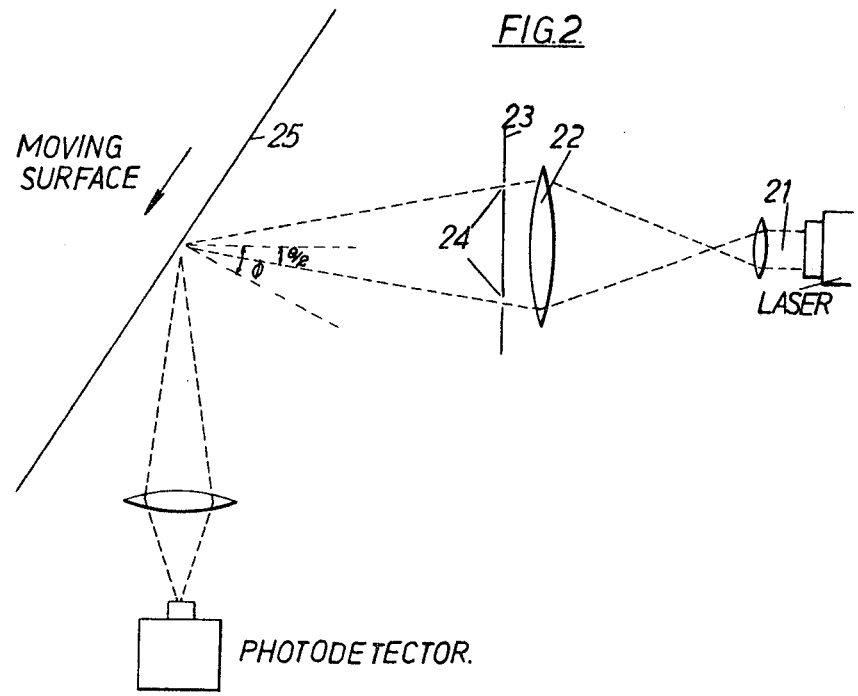

United States Patent Office 3,548,655
Patented Dec. 22, 1970

3,548,655
MEASUREMENT OF FLUID OR
SURFACE VELOCITIES
Michael J. Rudd, Westbury-on-Trym, Bristol, England, assignor to British Aircraft Corporation Limited, London, England, a British company
Filed Oct. 2, 1968, Ser. No. 764,465
Claims priority, application Great Britain, Oct. 4, 1967, 45,258/67; Feb. 23, 1968, 8,942/68
Int. Cl. G01f 1/00; G01p 5/00
U.S. Cl. 73—194                                     6 Claims

ABSTRACT OF THE DISCLOSURE

In a Laser Doppler Velocimeter particles suspended in a fluid or affixed to a moving surface pass through an interference pattern of fringes derived from a Laser source. The fringes are spaced apart in the direction of movement of the particles and the resultant periodic fluctuation in the amount of light absorbed or reflected by the particles is recorded on a fixed photo-detector. The Doppler variation in the frequency of these periodic fluctuations is representative of the velocity of the particles.

---

Aerodynamic problems in the design of aircraft structures are often solved using wind tunnels, and pressure fatigue testing is often carried out in water tunnels. When using these tunnels it is frequently important to know the speed of the fluid flowing through the tunnel at preselected points, and a convenient method of measurement, which avoids inserting a probe into the flow, is to use a laser Doppler velocimeter.

These velocimeters measure the velocity of fluid by suspending particles in the fluid and detecting a Doppler change in frequency of light scattered by the particles as they move across the focal point of a lens illuminated by a coherent light source. The scattered light effectively comprises a moving light source and the frequency shift is therefore representative of the velocity of the particles. The change in frequency, of the order of one part in $10^{10}$, is detected by recombining a preselected portion of the scattered light with the original light and picking up the resultant beats on a photodetector. However, since the fluid is normally transparent, only a very small proportion of the light is scattered, and even then, to collect an appreciable amount of scattered light a large receiving lens must be used and a small scattering angle employed. This means that the angle at which the Doppler shift is measured is not precisely fixed and hence a Doppler spectrum with an appreciable spread is produced.

According to the present invention the velocity or the size of particles suspended in a moving fluid, or affixed to a moving surface, is measured by arranging a coherent light source to produce an interference pattern of fringes in the fluid, or on the surface, the fringes being spaced apart in the direction of the movement of the particles such that the movement of each particle across the fringes produces a periodic fluctuation in the amount of light absorbed or reflected by the particle, and recording the said periodic fluctuations on a fixed photodetector. The constantly changing path length between the particle and the detector produces a Doppler variation in the frequency of the periodic fluctuations representative of the velocity of the particles and the magnitude of the said fluctuations is representative of the particle size. The photodetector and the light source are positioned on the same or opposite sides of the moving particles depending on whether changes in reflected or absorbed light respectively, are being recorded. The moving surface may be transparent, specularly reflective, or diffusely reflective, and in one application of the invention comprises steel strip emerging from a rolling mill.

In a preferred arrangement a laser beam is spread out to illuminate either a pair of slits in a mask, or a thick beam splitter, and the two resultant coherent light beams are focused by a lens to produce a set of sinusoidal fringes in the focal plane. The system is therefore self-aligning since both beams are focused at the same point by a common lens. The two beams may be derived from separate laser sources if the two sources are electronically coupled. In one embodiment of the invention the fringes are formed in a wind or water tunnel, and the light passing through the fringes is collected on the other side of the tunnel. A particle suspended in the fluid will produce a sinusoidal variation in the total amount of light transmitted, the crests occurring as the particle passes through the dark fringes. The actual freqency of the sinusoidal variations will therefore depend on the fringe spacing and the velocity of the particle and is given by the formula $$u = \frac{v \sin \theta}{\lambda}$$

where $v$=the velocity of the partcile perpendicular to the slits $\theta$=the angle between the beams and $\lambda$=the wavelength of the light. The frequency detected will be modified by the Doppler effect and to determine the velocity of the particle it is therefore necessary to measure the shift in frequency of the signal.

The magnitude of the signal depends on the total amount of light which is scattered and absorbed by the particle. In the previous system only a preselected portion of the scattered light was used, and the present system has therefore a much greater signal to noise ratio, the use of all the scattered light more than offsetting the reduction of signal due to the interposition of the mask.

Two examples representing different embodiments of the invention are shown in the accompanying drawings, in which:

FIG. 1 illustrates the optical system employed in a laser Doppler velocimeter for the measurement of velocities in a transparent liquid flowing along a tunnel;

FIG. 2 illustrates the optical system employed in a laser Doppler velocimeter for measuring the velocities of moving surfaces.

Figure 3:
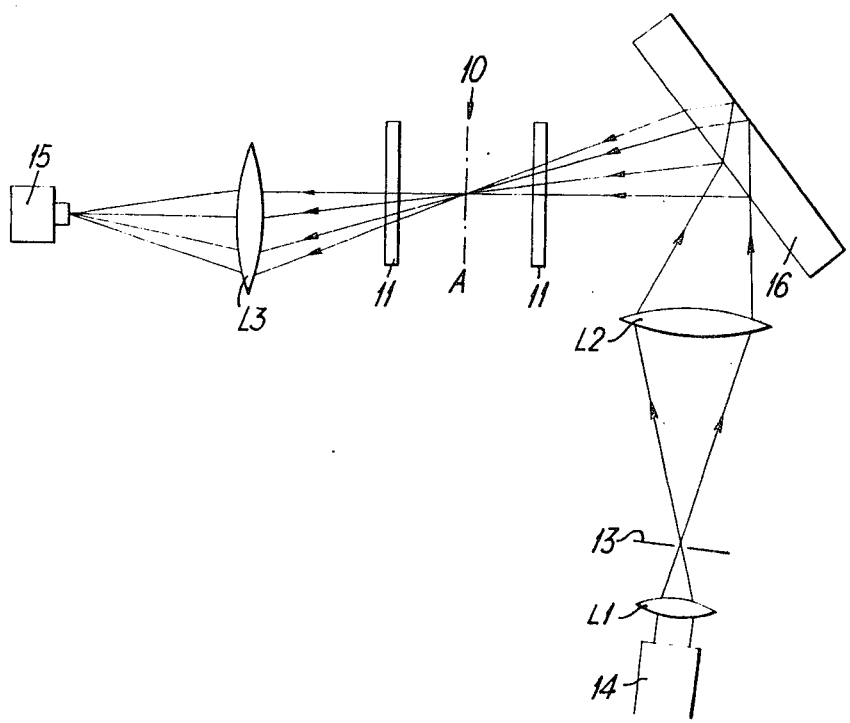
FIG. 3 is an optical system similar to those of FIGS. 1 and 2 but showing use of a thick beam splitter.

Referring to FIG. 1, a wind or water tunnel 10 includes transparent wall portions 11. A fluid running through the tunnel is considered to be flowing in a direction perpendicular to the plane of the paper. Light from a laser source 14 is converged by a microscope objective L1, and a lens L2 is spaced beyond the focal point of the lens L1 such that it receives a beam of enlarged cross section. A mask 12, having two slits, is placed over the lens L₂ and the two beams from the slits pass through the transparent wall portions of the tunnel to focus in the plane A. A pin hole 13 is placed at the focal point of L₁ to define the incident beam more precisely.

A sinusoidal fringe pattern appears in the plane A, the fringes being spaced apart in a direction perpendicular to the plane of the paper. The fluid contains a suspension of particles and whenever one of the particles crosses the pattern of fringes it cuts off some of the light. The amount cut off will vary sinusoidally as the particle crosses the alternate dark and bright fringes, the actual amount depending on the brightness of the light and the size of the particle. Light transmitted through the tunnel is collected by the lens $L_3$ and recorded on the photodetector 15. The actual frequency of the sinusoidal variations is given by the formula mentioned above, and hence, since the angle between the beams and the wavelength of the light are known, the velocity of the particle can be determined from the Doppler shift in frequency recorded at the photodetector. This Doppler effect is brought about by the constantly changing path length between the particle and the photodetector as the particle cuts the fringes.

The velocimeter can be used to measure velocities either steady or fluctuating in any transparent fluid which contains suspended particles. If a liquid is employed, it usually contains a sufficient number of particles to make it unnecessary to add any further particles, but a smoke generally need to be added to a gas. The velocimeter can also be used as a flow meter when employed to measure the speed of flow through a pipe and particle sizes could also be measured with this device as long as they are smaller than the fringe spacing. In this case it would be the magnitude of the sinusoidal variations which would be of interest, the instrument being calibrated with the particles of known size.

Referring to FIG. 2, a laser beam 21 is projected on to a lens 22 which is covered by a mask 23 having a pair of slits 24. The two coherent beams from the slits are focused on a specularly reflective moving surface 25 to produce an interference pattern. The surface may be coated with a number of light absorbent particles, although normally dust from the atmosphere which collects on the surface will be sufficient to achieve the desired effect. As any given particle moves across the fringes there will be a periodic change in the amount of light specularly reflected. Thus the output of the detector will fluctuate at a frequency $n$ given by $$n = \frac{v \sin \theta \cos \phi}{\lambda}$$

tween the beams, $\phi$=the angle of incidence of the beams, tween the beams, $\phi$=the angle of incidence of the beams, and $\lambda$=the wavelength of the light. The velocity of the surface is then calculated in the same way as shown in the example of FIG. 1 by measuring the Doppler shift in frequency of the recorded signal.

In neither embodiment need the optical system be set up to an extremely high degree of accuracy since both beams travel through the same lens and are brought to the same focus. Any windows that are employed when viewing, such as the transparent portions of the wind or water tunnel, do not have to be high quality optical flats. Moreover, the spread in the Doppler frequency which was quite considerable in the known velocimeter described in the introduction due to the wide angle receiving aperture, is now greatly reduced by the use of the narrow beams.

Referring lastly to FIG. 3, it will be obvious that the operation is identical to that of the other figures and that the only difference lies in the use of the thick beam splitter 16 in place of the mask 12 of FIG. 1.

Although the examples described have been concerned with the transmission through fluids and reflection from surfaces, it will be clear that the invention can apply equally well to transmission through transparent surfaces and reflection from particles suspended in a fluid.

What is claimed is:

1. A method of measuring the velocity of particles moving in a confined path comprising:

focusing a pair of coherent light beams to produce an interference pattern of fringes in the plane of movement of the particles, the fringes being spaced apart in the direction of movement of the particles such that the movement of each particle across the fringes produces a periodic fluctuation in the amount of light absorbed or reflected by the particle;

and recording the said periodic fluctuation on a fixed photo-detector, the constantly changing path length between the particle and the detector producing a Doppler variation in the frequency of the periodic fluctuation representative of the velocity of the particles.

2. A method as defined by claim 1 in which the particles are suspended in a moving fluid.

3. A method as defined by claim 1 in which the particles are affixed to a moving surface.

4. Apparatus for measuring the velocity of particles moving in a confined path comprising:

a coherent light source;

optical means arranged to focus a pair of coherent beams derived from the said source to produce an interference pattern of fringes in the plane of movement of the particles, the fringes being spaced apart in the direction of movement of the particles such that the movement of each particle across the fringes produces a periodic fluctuation in the amount of light absorbed or reflected by the particle;

and a fixed photodetector positioned to receive the said periodic fluctuations whereby the constantly changing path length between the particle and the detector produces a Doppler variation in the frequency of the periodic fluctuations representative of the velocity of the particles.

5. Apparatus according to claim 4 in which the said optical means comprises a first converging lens positioned adjacent the laser source, a second converging lens so spaced from the first lens as to receive a beam of enlarged cross-section and a mask having a pair of slits placed over the second lens to provide the said two coherent beams.

6. Apparatus according to claim 4 in which the said optical means comprises a thick beam splitter placed in the path of the laser beam emanating from the said source, the two coherent beams being obtained by reflection from the back and front surfaces respectively of the beam splitter, and a lens for focusing the two beams.

References Cited

UNITED STATES PATENTS

| 3,061,732 | 10/1962 | Milnes | 73—432X |
| 3,377,597 | 4/1968 | Muta | 73—432(PS)X |
| 3,448,406 | 6/1969 | McClure | 73—432(L)X |

OTHER REFERENCES

"Fluid Flow Measurements with a Laser Doppler Velocimeter," IEEE Journal of Quantum Electronics, vol. QE-2, No. 8, August 1966, by J. W. Foreman, Jr. et al., pages 260–266 relied on, copy in group 284(73/432(L)).

LOUIS R. PRINCE, Primary Examiner

H. C. POST III, Assistant Examiner

U.S. Cl. X.R.

73—432